W. W. WILDMAN & E. A. TINSMAN.
RUBBER TIRE FOR VEHICLES.
APPLICATION FILED MAY 25, 1914.

1,169,218.

Patented Jan. 25, 1916.

Witnesses.
B. P. Taylor.

Inventor.
William W. Wildman
Edgar A. Tinsman
by Fisher &Moore
Atty.

THE COLUMBIA PLANOGRAPH CO., WASHINGTON, D. C.

UNITED STATES PATENT OFFICE.

WILLIAM W. WILDMAN AND EDGAR A. TINSMAN, OF BARBERTON, OHIO, ASSIGNORS TO THE PORTAGE RUBBER COMPANY, OF BARBERTON, OHIO, A CORPORATION OF OHIO.

RUBBER TIRE FOR VEHICLES.

1,169,218.  Specification of Letters Patent. Patented Jan. 25, 1916.

Application filed May 25, 1914. Serial No. 840,674.

*To all whom it may concern:*

Be it known that we, WILLIAM W. WILDMAN and EDGAR A. TINSMAN, citizens of the United States, residing at Barberton, in the county of Summit and State of Ohio, have invented certain new and useful Improvements in Rubber Tires for Vehicles, of which the following is a specification.

This invention has reference to rubber tires, and the invention consists in what is known as a solid rubber tire having stiff rubber strips embedded and vulcanized in the base thereof and adapted to secure the tire on a clencher rim and to prevent undue stretching of the tire, all as hereinafter fully described and particularly pointed out in the claim.

Figure 1:
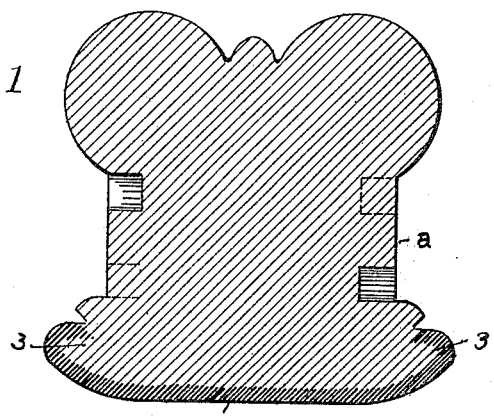
Figure 2:
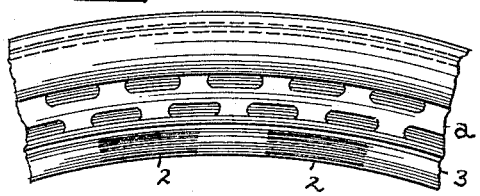
Figure 3:
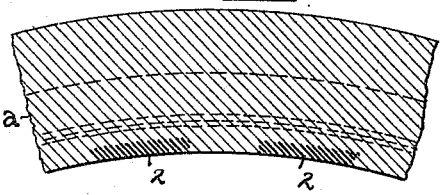
Figure 4:
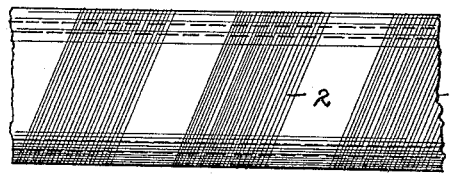
Figure 5:
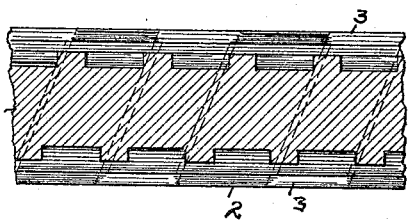
Figure 6:
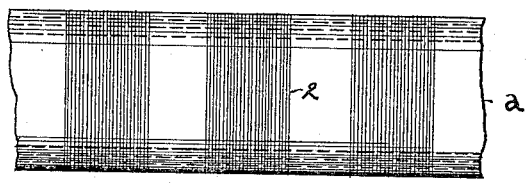

In the accompanying drawings Figure 1 is a cross section of the tire on the line of one of the reinforcing strips. Fig. 2 is a side elevation of a section of the tire and Fig. 3 is a longitudinal section of Fig. 2. Fig. 4 is a bottom or inside view of said section and Fig. 5 is a horizontal plan view of said section substantially through the middle lengthwise. Fig. 6 is a modification showing the hard rubber strips directly across instead of diagonal as in Fig. 4.

In explanation of the invention as thus disclosed it will of course be understood that the ordinary hard rubber is brittle and will break very easily, and for this reason the composition we are using in the base of our new tire is of such consistency or quality that it can be compressed enough to cause the base of the tire to enter the clencher rim and then spring back under the rim in such a way that the tire will be held tightly in said rim, the said rim being first put on the vehicle wheel ready to receive the tire, as usual.

The only really successful solid tires of the kind to which this invention relates that we are familiar with have steel pins or wires inserted diagonally through the rubber base, because if these wires were put in straight across the base it would be impossible to get the base down in the clencher rim. But tires with rods or wires of this kind in the base are not satisfactory for different reasons and particularly because there is a considerable vibration in the base of such tires and in time the said rods, of whatever size, cut the rubber or enlarge the holes around the rods to such an extent that the rods really do but little good. We also are aware that cushion or solid tires are now being made in which the entire base in circumference is hard rubber, but such tires must be applied to wheels where removable flanges or fastenings are used by being bolted on each side of the tire to hold it on the wheel, and the hard rubber being continuous around the circumference of the tire it will not permit such a tire to be stretched, whereas a tire made along the lines of the present invention permits the tire to be stretched over the clencher rim and it is not necessary to have a rim where the side clencher can be loosened or removed.

Another point about this invention is, that the semi-hard or stiff rubber strips are preferably put on diagonally, that is, not right straight across the base but inclined to a directly transverse line. When the said rubber strips or pieces are put on in this manner it will be harder to compress the whole base of the tire any distance and the tire will not be so easily stretched in the circumference as if the hard rubber were put on the base right straight across. Another advantage is that the standard tire applying tools can be used to apply tires with our improvement the same as are now generally used with clencher rims, and when the tires of our invention are worn out or discarded they can be disposed of to the rubber scrap dealer at a much better price than those which contain metal in the base.

Now, referring to the drawings the tire $a$, in any event is designed to be of the so-called solid type, but this term is to be liberally construed so that it shall cover tires adapted to be bodily slipped over or upon a wheel having clencher rims. Hence the terms compressible or stretchable, which would mean elastic, semi-hard or yielding are fairly descriptive of the kind of rubber used and are intended to cover the same quality or condition of rubber. Obviously no one word expresses the state of the rubber best adapted to this use, because in order to have a measure of resilience along with durable service on the road the tire should be more or less yielding but not too flexible or compressible. Yet to spring the tire over clencher rims it must stretch and yield enough to make such engagement. Marginal descriptive terms are therefore employed. The said tire comprises homogeneous strips 2, which also are definable in various terms more easily than in a single one, for the reason that while said strips are substantially rigid or stiff, so as to serve the purpose of the practically rigid steel cross wires heretofore used, the said strips notwithstanding should possibly flex somewhat under severe strain without breaking or pulling out of the clencher rim. Furthermore, they are hard or what might be called semi-hard and yet firm and strong enough to lock the tire permanently in the rim. The said strips also are of greater width than thickness and are both embedded in the base of the tire and vulcanized therein flush with the surface of the tire and homogeneous therewith. Hence there is no wear and tear in the tire as there always is with metal rods. The said strips also are preferably placed diagonally to the circumference of the base or direction of travel as hereinbefore set forth, and the ends are bent completely over and into the side extensions, beads or projections 3 at the base of the tire at either side thereof as shown in Fig. 1. Thus gives the said strips a double strength in said beads or projections at the point where the strain is greatest, and thus we not only provide a substitute for the wires or rods heretofore used for the same purpose but which by reason of the width and strength and doubled ends of said strips makes a decided improvement over wire rods or their equivalent in metal. But there is also another function in the present strips which is material and entirely new and original with us, and which consists in the prevention of over stretching of the tire. One of the greatest troubles with a cushion or solid tire of this general kind is its natural tendency to take on a permanent stretch, and the heavier the load the greater the danger, so that before long the tire may become too large for the steel rim on which it is mounted. This is a very common and very objectionable fault, and it is largely overcome by the strips we employ, whether they be placed diagonally or straight across, because at least half or more of such stretch is prevented by said strips. Of course, the strips are made of non-stretchable rubber and being bodily incorporated in the base by vulcanization they become a permanent portion of the part of the tire where the trouble has heretofore occurred. We might, of course, widen the said strip above what is shown and still further reduce this tendency, but strips placed about as shown seem to provide for all needed precaution in this particular as well as being thoroughly effective as means to confine the tire on the rim.

What we claim is:

A rubber tire of the solid type and slightly stretchable having side enlargements along its base and semi-hard non-stretchable rubber strips vulcanized into said base at regular intervals and the ends of said strips substantially hook shape and engaged over said side enlargements of the base and said strips diagonally disposed transversely of the tire and flush with the surface thereof.

In testimony whereof we affix our signatures in presence of two witnesses.

WILLIAM W. WILDMAN.
EDGAR A. TINSMAN.

Witnesses:
Z. GRIFFITH,
D. A. DOYLE, JR.